(No Model.)
H. C. SPALDING.
COMPOUND ELECTRICAL CABLE.
No. 327,459. Patented Sept. 29, 1885.
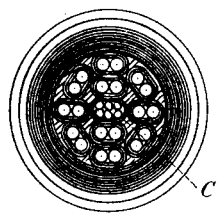
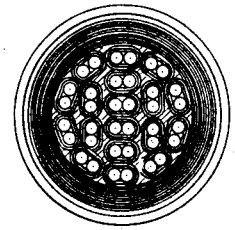
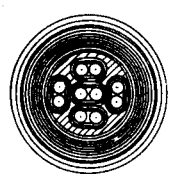
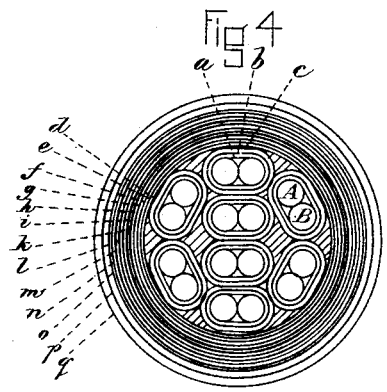
Witnesses
W. Frisby
W. H. Doggett
Inventor
Henry C. Spalding
By Parker W. Page
atty.

UNITED STATES PATENT OFFICE.

HENRY C. SPALDING, OF BOSTON, MASSACHUSETTS.

COMPOUND ELECTRICAL CABLE.

SPECIFICATION forming part of Letters Patent No. 327,459, dated September 29, 1885.

Application filed May 15, 1884. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Compound Electrical Cables, of which the following is a specification, reference being had to the drawings accompanying and forming a part of the same.

My present invention relates to compound cables in which the conductors are arranged in pairs to form complete or two-wire circuits, and each pair or circuit protected from the electrical inductive influence of the others and the electricity of the earth.

I have described in other applications filed by me cables of this character, in which the protection against inductive influences is secured by surrounding each circuit by an insulated metallic sheath or casing, and by surrounding the group or assemblage of such circuits by one or more insulated sheaths, and in a novel method of assembling the conductors of these cables my present invention mainly consists.

In carrying out my invention I lay two insulated wires side by side, and then, having coated them with a suitable varnish, wind around them a strip of paper which is saturated with paraffine. Another coating of varnish is then applied, and upon this a strip of metallic foil is wound. This also is varnished and covered by a spirally-wound strip of paper. The cable thus formed is in cross-section nearly elliptical, so that when a number of them are grouped together in a compound cable a special arrangement is necessary in order to form an approximately-round bundle and bring the greatest number into the smallest possible space.

The arrangement which I have adopted is to lay a given number of the elliptical cables one upon the other, with their major axes parallel, and then to lay on each side of this series the remaining cables of the number required at varying angles, in order to round out the bundle. The cables thus grouped are inclosed in various sheathings of insulating material and metal, the former being paper saturated with paraffine and wound on or in a viscous varnish composed of a compound of resin and a vegetable oil.

To more particularly describe the invention, reference is made to the accompanying drawings, in which—

Figures 1, 2, and 3 are cross-sectional views of compound cables constructed in accordance with my invention and containing different numbers of wires. Fig. 4 is a cross-section of a cable drawn on a larger scale.

A B designate the wires of a circuit. Each is insulated, and the two are laid side by side without being twisted. The insulating-covering is coated with a viscous varnish, upon which is wound a sheathing of paper, $a$. This is varnished and incased in a sheathing of metal foil, $b$, which in its turn is varnished and wrapped with paper $c$. Each pair of conductors is treated in a similar manner. When a given number of these protected circuits are to be combined in one cable, a portion of the elliptical cables are laid upon one another in line, and the remainder are placed on each side of the pile at varying angles, as indicated in the several figures. The group is then inclosed by insulating and protective coatings. I have indicated in Fig. 4 a covering which I use, and which is applied in the manner described in various other applications filed by me. This covering is composed of the following layers, sheathings, and coats: $d$, fibrous material saturated with paraffine; $e$, varnish; $f$, metal, as tin-foil; $g$, fibrous material saturated with paraffine; $h$, varnish; $i$, metal; $k$, fibrous material; $l$, varnish; $m$, metal; $n$, fibrous material; $o$, a layer of a viscous bituminous compound; $p$, a serving of spirally-wound twine; $q$, a jacket or armor.

The fibrous material which I use is preferably Manila paper; the varnish a compound of boiled linseed-oil and crude turpentine, though I may use turpentine in any reduced condition, or even resin, if care be taken to increase the proportion of linseed-oil, as the resinous matter is more solid. Other oils than linseed may be used with the resin to render the compound permanently, but very slightly, viscous.

In lieu of the central elliptical cable in the compound cable described, I may place a bundle of steel wires, c, Fig. 1, to give strength to the cable. This bundle is formed in substantially the shape as that of the cables, in order not to disturb the symmetrical arrangement of the bundle.

In practice the exact positions of the cables indicated in the drawings will be often disturbed; but in order to secure the best results, as indicated herein, the minor cables should be at the start grouped or assembled in the described relations.

Having now described my invention, what I claim is—

1. In a compound electrical cable, the combination, with a number of insulated pairs of wires or minor cables elliptical in cross section and grouped in a substantially-circular bundle, of a covering composed of layers of insulating material and metal sheaths or screens, as herein set forth.

2. In a compound electrical cable, the combination, with a number of pairs of insulated wires, each pair surrounded by a covering composed of layers of insulating material and a metallic sheath, and forming cables elliptical in cross-section, which are grouped in a substantially-circular bundle, of a covering composed of layers of insulating material and metal sheaths or screens, as herein set forth.

3. In a compound electrical cable, the combination, with a central strengthening-core, of a group of minor cables arranged around the same, both the core and the cables being elliptical in cross-section, and each cable containing two insulated wires, substantially as herein set forth.

In testimony whereof I have hereunto set my hand this 13th day of May, 1884.

HENRY C. SPALDING.

Witnesses:
EDWARD H. RYDER,
W. S. WOOD.